United States Patent

[11] 3,612,774

[72] Inventor Edgard R. Wiklund
Atlanta, Ga.

[21] Appl. No. 795,931
[22] Filed Feb. 3, 1969
[45] Patented Oct. 12, 1971
[73] Assignee Robert N. Fink
Decatur, Ga.
Continuation-in-part of application Ser. No. 789,155, Jan. 6, 1969.

[54] SNAP-ON ERASING MEMBER FOR COMPACT CASSETTE RECORDER
7 Claims, 3 Drawing Figs.

[52] U.S. Cl. .......... 179/100.2D, 179/100.2 Z
[51] Int. Cl. .......... G11b 5/02, G11b 15/60
[50] Field of Search .......... 179/100.2D, 100.2 Z, 100.2, 100.2 C

[56] References Cited

UNITED STATES PATENTS

| | | | |
|---|---|---|---|
| 2,466,514 | 4/1949 | Vagtborg | 179/100.2 D |
| 2,688,053 | 1/1950 | Barany et al. | 179/100.2 D |
| 3,024,320 | 3/1962 | Nye | 179/100.2 D |
| 2,866,009 | 12/1958 | Genning et al. | 179/100.2 D |
| 3,274,347 | 9/1966 | Page | 179/100.2 D |

*Primary Examiner*—Bernard Konick
*Assistant Examiner*—Alfred H. Eddleman
*Attorney*—Newton, Hopkins & Ormsby

ABSTRACT: The combination with a compact cassette-type tape recorder of a snap-on readily removable permanent magnet erasing member which fits between the removable cartridge and the inside wall of the cassette cavity of the recorder for erasing the magnetic tape when the tape is rewound. The erasing member has two longitudinally spaced, transversely disposed magnets on a flat carrier and longitudinally and transversely spaced detents for projecting through windows in the cassette so that the erase member may be snapped onto the cassette.

INVENTOR
EDGARD R. WIKLUND

BY: Newton, Hopkins, & Ormsby
ATTORNEYS

SNAP-ON ERASING MEMBER FOR COMPACT CASSETTE RECORDER

CROSS-REFERENCE TO RELATED APPLICATION

This is a continuation-in-part of my copending application filed Jan. 6, 1969 Ser. No. 789,155, and entitled "Erasing Member for a Compact Cassette Recorder."

BRIEF SUMMARY OF THE INVENTION

This invention relates to compact cassette recorders and is more particularly concerned with an erasing member for a compact cassette recorder for rapidly erasing previously recorded material on the magnetic tape of the cassette.

In the past, numerous compact cassette tape decks or player-recorders have been devised. Such a compact cassette recorder provides a recess into which a magnetic tape cassette is inserted flatwise or sidewise. When the machine is manipulated for dictation, capstans which project up within the cassette recess, drive the tape slowly across an erase head and then across a record head so that, immediately prior to receiving signals to be recorded on the tape, the magnetic tape is erased. Upon rewind, the two heads are withdrawn and the tape is driven rapidly in the opposite direction.

Heretofore, however, there has been no inexpensive means of rapidly erasing the magnetic tape, except on a bulk eraser. Of course, I appreciate that, in certain tape recorders, there is an erase head incorporated with the tape recorder so that the tape may be erased as it is rewound; however, no such erasing mechanism is found in most compact cassette recorders and none are removable with the cassette.

Briefly described, the present invention includes a permanent magnet carried on a carrier, i.e. a thin flat nonmagnetic carrying plate. Two longitudinally spaced transversely disposed permanent magnets are so dimensioned that they simultaneously project into openings in the front side of the casing of the cassette or cartridge so as to engage the tape at spaced intervals, the inward movement of the permanent magnets being limited by the carrying plate which is larger than the opening or window. The plate extends across the front surface of the cartridge or cassette and is positioned in place by detents in the form of projections received in the corners of the windows or openings in the front wall of the cassette.

The invention contemplates that the permanent magnets be of a width to extend transversely across both tracks or all of the tracks on the magnetic tape and that the north pole of one magnet and the south of the other magnet be on one side so as to drive the magnetism of the tape first in one direction and then in the other; however, in certain embodiments of the invention, it may be found desirable to provide only a single magnet.

An important aspect of my invention is that the detents are so arranged that they guide the tape and do not interfere with the travel of the tape while firmly and yieldably attaching the erasing member to the cassette. By such an arrangement, the erasing member will not be inadvertently removed from the cassette but the detents are sufficiently yieldable for ready removal of the member by hand. Also, the member and the cassette can be inserted as a unit into the cassette cavity.

DETAILED DESCRIPTION OF THE INVENTION

Figure 1:
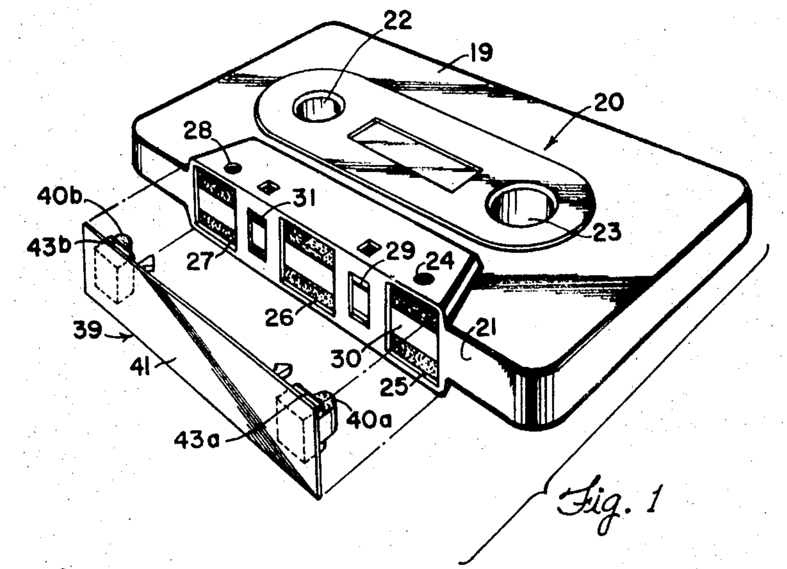
FIG. 1 is an exploded view of a conventional cassette or cartridge for a compact cassette-type tape recorder, together with an erasing member of the present invention.
Figure 2:
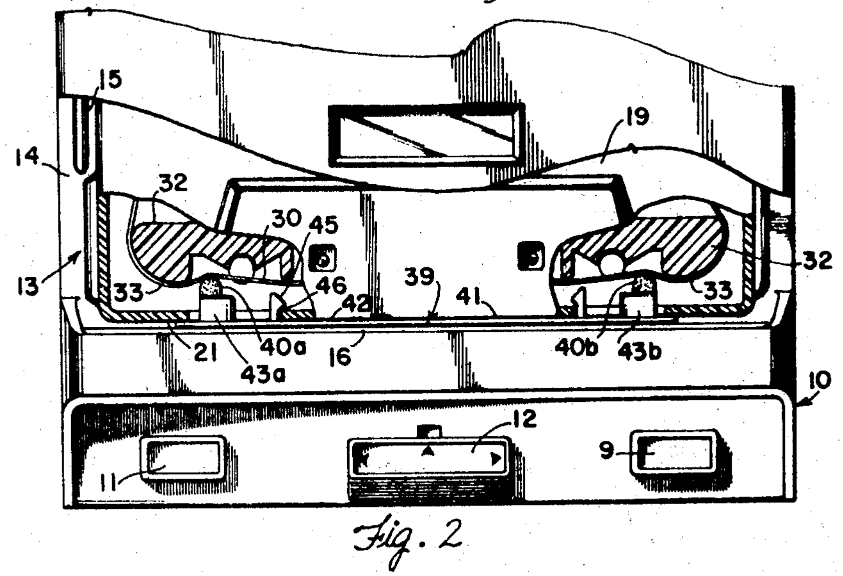
FIG. 2 is a fragmentary plan view of a conventional compact cassette recorder receiving the conventional cartridge and the erasing member of FIG. 1 for erasing the magnetic tape.

Referring now in detail to the embodiment chosen for the purpose of illustrating the present invention, numeral 10, in FIGS. 1 and 2 denotes generally a compact cassette-type recorder which can both transcribe and playback material on magnetic tape. The recorder 10, has the usual controls 9, 11, and 12, and has a recess or cavity 13, which is defined by a bottom wall 14, sidewalls such as wall 15, a backwall (not shown) and a front wall 16.

The cassette recorder 10 is only illustrative of one of the many forms of compact cassette recorders. Recorder 10 is adapted to receive the cartridge or cassette 20 in the cavity 13 so that the front wall 21 of its casing 19 abuts wall 16 of the cassette recorder 10. When casing 19 is in proper position, the spindles (not shown) of recorder 10 project through the center openings 22 and 23 of the tape reels while a capstan drive shaft (not shown) projects through a transverse capstan hole 24 in the casing 19 to cooperate with the capstan follower (not shown) which projects through capstan follower opening or window 25 of the casing 19.

The casing 19 also has a central opening or window 26 in the front wall 21 and a capstan follower opening or window 27. The window 27 is complimentary to the window 25, being in the front wall 21 and being on a side from window 26 opposite the side containing the window 25. When the tape recorder 10 is recording, an erase head (not shown) of recorder 10 projects through the window 27. A capstan follower (not shown) also projects through the window 25 so that the magnetic medium or magnetic tape 30 is driven at a uniform speed across the erase head and across the record head. During rewinding, however, the record head and the erase head of the recorder 10 are withdrawn and the magnetic tape 30 is simply rapidly rewound, without any erasure of the recording thereon.

In addition to the openings or windows 25, 26, and 27, there is an intermediate smaller window 29 between window 25 and 26 and an intermediate smaller window 31 between the window 26 and 27. Windows 25, 26, 27, 29, and 31 are each rectangular openings transversely spaced along the front wall 21 of the casing 19.

As viewed in FIG. 2, the casing 19, within its interior has at its front corners, opposed slide blocks 32 which contain the capstan holes 24 and 28 respectively. Outwardly of holes 24 and 28 the blocks 32 are provided with rounded tape slide surfaces 33, across which the tape 30 passes. The holes 24 and 28 are rearwardly adjacent the windows 25 and 27.

It will be understood by those skilled in the art that the symmetrical cartridge or cassette 20 may be turned over so that a second track of magnetic tape or medium 30 of cartridge 20 is utilized for recording purposes. In such an arrangement, the capstan (not shown) of the magnetic tape recorder 10 would project through the hole 28 rather than the hole 24. Also, during the recording operation, the erase head (not shown) would project through window 25 and the capstan follower (not shown) would project through the window 27.

It will be understood that while the tape recorder, such as recorder 10 receives the cassette 20, sidewise, into recess 13 other types of recorders 10 will receive the cassette 20, endwise, i.e. front wall 21, first, into a thin slot.

The structure thus far described is conventional, the illustrated structure being found specifically in a Norelco compact cassette recorder.

According to the present invention I have provided a permanent magnet erasing member which, in the drawings is denoted generally by numeral 39. The erasing member includes a flat thin rectangular sheet or substrate or plate 41 which forms the carrier for the permanent magnets **40*a* and 40*b*. The dimensions of the carrier, i.e. plate 41, are quite critical in that the dimensions must be less, or at least only slightly larger than the dimensions of the front wall 21 of the cassette 20. This is so that the carrier 41, when placed against the wall 21, will not protrude to any appreciable extent in any direction so as to prevent the insertion of the cassette 20 into the recorder 10. Of course, any carrier 41 which will carry the magnets 40*a* and 40*b* and yet not interfere with the insertion of cassette 20 within the recorder 10 would be suitable. The thickness of the carrier 41 is also quite critical in that it cannot be thicker than the natural clearance between the wall 16 and the wall 21 when the cassette 20 is properly inserted into the recorder 10. Otherwise, the carrier 41 may prevent the cassette 20 from being properly positioned in place or may cause the spindles and capstans of the recorder 10 to bind against the cassette 20**.

With respect to the magnets 40*a* and 40*b*, they are each a right prism member, the inner surface of which is arcuate, i.e. semicylindrical, the arcuate surface being generated about a vertical axis. The two axes of magnets 40*a* and 40*b* are parallel to each other and the magnets 40*a* and 40*b* are in transverse alignment, being secured to the inner surface 42 of the carrier 41.

To assure that the magnets 40*a* and 40*b* are not inadvertently broken from the carrier, the magnets 40*a* and 40*b* are respectively provided with C-shaped shields 43*a* and 43*b*. These shields 43*a* and 43*b* are integrally molded or cast with plate 41, in the event that the plate is formed of plastic, as is preferable. Each of the shields 43*a* or 43*b* is provided with a vertical leg inwardly of its associated magnet 40*a* or 40*b* and a pair of horizontally extending legs above and below its associated magnet 40*a* or 40*b*.

The dimensions of the shields 43*a* and 43*b* are respectively less than the dimensions of the windows 25 and 27 through which these two shields are to project. Furthermore, the shields 43*a* and 43*b* are spaced apart by a distance greater than the distance between the inside edges of windows 25 and 27 but less than the outside edges of windows 25 and 27 whereby the shield 43*a* and 43*b* may project through the respective windows 25 and 27 without engaging the vertical sides thereof. The width of shields 43*a* and 43*b* is less than the width of the magnets 40*a* and 40*b* whereby the three sides of the magnets 40*a* and 40*b* may be respectively encompassed by the shields 43*a* and 43*b*. The outer ends of the arms of the shields 43*a* and 43*b* terminate in the same vertical plane with the outer sides of the magnets 40*a* and 40*b*.

While the magnets 40*a* and 40*b* are of less height than the shields 43*a* and 43*b* and therefore must be of less height than the windows 25 and 27, nevertheless, these magnets are wider than the width of the tape or magnet medium 30 so that they may extend transversely across the entire tape 30, when the erasing member 39 is installed on the front face 21 of cassette 20.

Figure 3:
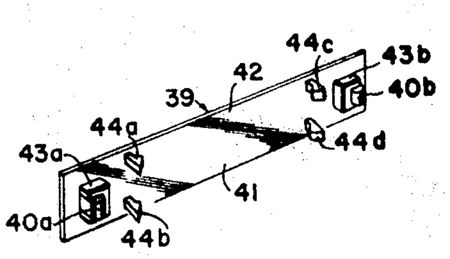
FIG. 3 is a perspective view of the erasing member shown in FIG. 1.

As best seen in FIG. 3, the carrier 41 along its inner surface 42 is provided with four transversely and longitudinally spaced inwardly protruding fingers 44*a*, 44*b*, 44*c*, and 44*d*. The fingers 44*a*, 44*b*, 44*c*, and 44*d* are identically shaped to each other, each having a body or shank which protrudes perpendicular to the surface 42 in an inwardly direction in respect to the cassette 20, the shank terminating in an enlarged triangularly shaped head which forms inner and outer camming surfaces 45 and 46 which come together at a rounded type of apex.

The fingers 44*a* and 44*b* are in vertical alignment while the fingers 44*c* and 44*d* are also in vertical alignment transversely of the plate 41. Furthermore, fingers 44*a* and 44*c* are longitudinally aligned while fingers 44*b* and 44*d* are likewise in longitudinal alignment. The fingers 44*a* and 44*b* face the fingers 44*c* and 44*d* so that the camming surfaces face each other.

The spacing between fingers 44*a* and 44*b* is greater than the width of the magnetic tape 30 whereby the tape 30 may pass freely between the fingers 44*a* and 44*b*. In like manner, the space between the fingers 44*c* and 44*d* is greater than the transverse width of tape 30 for the same reason. Also, the magnets 40*a* and 40*b* are disposed transversely between the fingers 44*a*, 44*b*, and between the fingers 44*c*, 44*d*. In this manner, the tape 30 is maintained in alignment so that the magnets 40*a* and 40*b* will cover transversely the entire tape 30 when the erasing member 39 is properly installed on cassette 20.

The extreme surfaces between the fingers 44*a* and 44*b* and between fingers 44*c* and 44*d* are disposed apart by a distance less than the height of the windows 25 and 27, whereby, when the erasing member 39 is to be installed on the cassette 20, fingers 44*a* and 44*b* will protrude through window 25 as the fingers 44*c* and 44*d* will protrude through window 27. The distance between finger 44*a* and 44*c*, i.e. the longitudinal distance between the detent members, is approximately equal to or slightly greater than the distance between the inner vertical edges defining openings 25 and 27, whereby, as the erasing member 39 is installed on cassette 20, the camming surface 45 of the detent members 44*a*, 44*b*, 44*c*, and 44*d* will simultaneously engage the edges defining windows 25 and 27 and will be urged outwardly as the erasing member 39 is installed.

The distance from the camming surface 46 of each finger 44*a*, 44*b*, 44*c*, and 44*d* is slightly greater than the thickness of the cassette 20 at the front wall 21, whereby the head of each detent member 44*a*, 44*b*, 44*c*, and 44*d* will spring back into place and firmly but removably and yieldably retain the erasing member 39 in place on front wall 21, as illustrated in FIG. 2. The detent members 44*a*, 44*b*, 44*c*, and 44*d*, when the erasing member 39 is installed on cassette 20, are disposed approximately in the inner corners of the windows 25 and 27 and therefore do not permit any appreciable twisting or canting of the erasing member 39, the registry of the erasing member 39 being such that the magnets 40*a* and 40*b* are appropriately disposed so that the tape 30 passes simultaneously across both magnets 40*a* and 40*b*.

The magnets 40*a* and 40*b* are arranged with opposite polarity, with respect to the tape 30 so as to drive it first in one direction and then in the other. In other words, a north pole of magnet 40*a* would be on the same side or edge of the carrier 41, as a south pole of magnet 40*b*. This will assure substantially complete erasure of the tape 30 as it is moved quite rapidly across both curved surfaces of the magnets 40*a* and 40*b*.

OPERATION

From the foregoing description, it is apparent that, when the erasing member 39 of the present invention is to be used, it is snapped in place on the front surface 21 of cassette 20. This is accomplished by inserting the two magnets 40*a* and 40*b* into the windows 25 and 27 respectively, being careful to align the detent members 44*a* and 44*b* with the vertical inner edge of window 25 and the detent members 44*c* and 44*d* with the vertical edge of window 27. Thereafter, the erasing member 39 is urged inwardly whereby the camming surfaces, such as camming surface 45 pivots each of the detent members 44*a*, 44*b*, 44*c*, and 44*d* outwardly in a lateral direction and then they spring inwardly, after the heads have passed the thickness of the sidewall 21. By such an arrangement, the camming surfaces, such as surface 46 engages the inner vertical edges of the parts of walls 21 which define the windows 25 and 27 so as to retain snugly the plate 41 against the cassette 20.

By such an arrangement, the cassette 20 can be inserted into an appropriate opening such as cavity 13 of any conventional cassette-type tape recorder 10. It makes little difference whether the cassette 20 is disposed vertically, or horizontally or whether or not the cassette is subjected to vibration since the detent members 44*a*, 44*b*, 44*c*, and 44*d* retain the erasing member firmly in place.

After the cassette 20, together with the erasing member 39 is installed, as perhaps illustrated in FIG. 2, the controls, such as control 12 of the cassette-recorder 10 is manipulated in such a manner as to cause the rapid rewind of tape 30. In such an operation, the tape rapidly travels across the magnet 40*a* and across the magnet 40*b*. It makes little difference which magnet is passed first. Indeed, it may be found desirable, when less complete erasure is required to eliminate one of the two magnets 40*a* or 40*b* from the device.

I claim:

1. The combination with a cassette recorder having a plurality of windows in the front wall of the cassette adjacent which the magnetic recording tape passes, of an erasing member comprising a permanent magnet of smaller dimensions than one of said windows, said magnet projecting into the cassette through said window and contacting the tape, a carrier for said magnet and detent members on said carrier, said detent members projecting through said window and yieldably engaging a wall thereof for holding the carrier in place on the front wall of the cassette said carrier being a thin flat plastic plate and said detent members being formed integrally with said plate and projecting laterally from it, said detent members having camming surfaces at their outer ends, which surfaces engage a wall of the window.

2. The combination of claim 1 wherein the detent members comprise two spaced fingers located at one side of the magnet, one finger being located above the tape and the other below it so that the fingers prevent dislocation of the tape laterally.

3. The combination of claim 1 wherein said carrier is formed to provide an integral C-shaped shield member enclosing three sides of said magnet to protect it against being broken from the carrier.

4. The combination of claim 1 wherein said magnet is located at one end of the carrier and a second magnet is located at the opposite end of said carrier, and wherein the cassette is provided with two spaced windows, each magnet projecting through one window, and wherein spaced detents are provided adjacent said second magnet, said detents engaging a wall of the window through which that magnet projects.

5. The combination of claim 4 wherein said carrier is a thin flat plate and the detent members are formed integrally with said plate and project laterally from it and wherein said detent members have camming surfaces at their outer ends engaging a wall of the window through which they project.

6. The combination of claim 5 wherein the carrier is formed to provide integral C-shaped shield members one member enclosing three sides of each magnet.

7. The combination of claim 6 wherein the north pole of one magnet and the south pole of the other lie adjacent the same edge of the tape so that the magnetism of the tape will be driven first in one direction and then in the other.